United States Patent [19]

Rauch et al.

[11] Patent Number: 4,835,870
[45] Date of Patent: Jun. 6, 1989

[54] DEVICE FOR MEASURING THE DISTANCES AND DIRECTIONS OF DESTINATIONS ON ROAD MAPS

[75] Inventors: Hans Rauch, Fürth; Eva Osterkamp, Burgthann; Norbert Stepper, Berg, all of Fed. Rep. of Germany

[73] Assignee: Robert Bosch GmbH, Stuttgart, Fed. Rep. of Germany

[21] Appl. No.: 50,296

[22] PCT Filed: Jun. 13, 1986

[86] PCT No.: PCT/DE86/00247

§ 371 Date: May 5, 1987

§ 102(e) Date: May 5, 1987

[87] PCT Pub. No.: WO87/01442

PCT Pub. Date: Mar. 12, 1987

[30] Foreign Application Priority Data

Sep. 7, 1985 [DE] Fed. Rep. of Germany ....... 3532016

[51] Int. Cl.⁴ .......................... G01B 3/10; G01C 21/00
[52] U.S. Cl. ..................... 33/1 C; 33/1 SB; 33/760
[58] Field of Search .............. 33/1 SB, 1 D, 30 MP, 33/138, 471, 1 C

[56] References Cited

U.S. PATENT DOCUMENTS

| 3,082,534 | 3/1963 | Susikari | 33/138 |
| 3,514,863 | 6/1970 | Moll | 33/138 |
| 3,568,319 | 3/1971 | Moll | 33/138 |
| 3,651,574 | 3/1972 | Burkart | 33/1 SB |
| 3,813,783 | 6/1974 | Price | 33/1 SD |
| 4,642,898 | 2/1987 | Miller | 33/138 |

FOREIGN PATENT DOCUMENTS 110844 6/1984 European Pat. Off.

Primary Examiner—Robert S. Ward
Assistant Examiner—Patrick R. Scanlon
Attorney, Agent, or Firm—Michael J. Striker

[57] ABSTRACT

A device for measuring the distance and direction of destinations on road maps from a starting point is suggested which serves for the data input of intermediate destinations in navigation devices. The device comprises an angle measuring plate (10) with a 360-degree scale (13) which is arranged concentrically relative to a central borehole (14) and which begins with the north direction. A bracket (11) is supported at the central borehole (14) so as to be rotatable and carries a measuring tape case (12) at its end area (11b) and a guide (20) for a measuring tape (19) at its opposite end area (11c), the measuring tape (19) being arranged in such a way that, when drawn out of the measuring tape case (12), the measuring tape (19) extends away radially in an outward direction with its one lateral edge over the center of the degree scale (13). The input of distance and directional angle of an intermediate destination can be determined with a single adjustment with this device which has a compact construction, small dimensioning and large measuring range (FIG. 3).

8 Claims, 2 Drawing Sheets

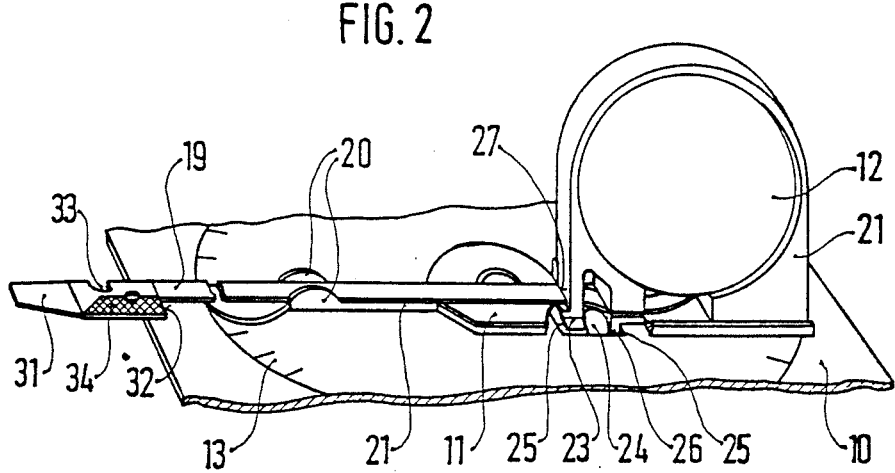
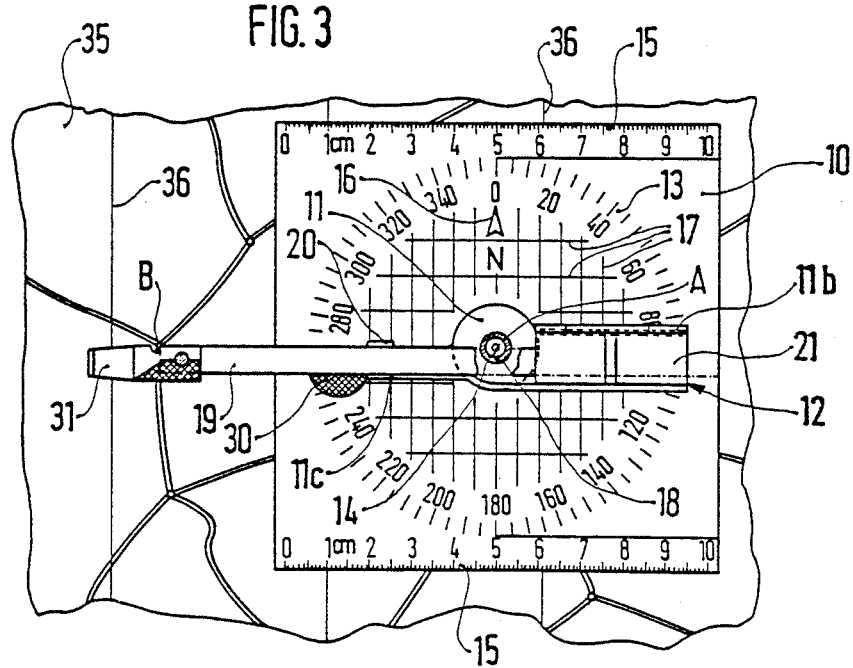

DEVICE FOR MEASURING THE DISTANCES AND DIRECTIONS OF DESTINATIONS ON ROAD MAPS

PRIOR ART

The invention is based on a device for measuring the distance and direction of destinations on road maps according to the generic part of the main claim. In such a commercially available measuring device for the input of intermediate destinations in navigation devices of vehicles it is known to arrange a 360-degree scale with an allocation of the cardinal points on a transparent measuring plate, wherein the degree scale is plotted in the clockwise direction proceeding from the north direction. Moreover, the measuring plate, which has a practically square shape, is provided at the sides with longitudinal scales in various scales. A borehole, in which a thread is fastened, is located in the center of the degree scale. When the measuring plate is placed on a road map with the center borehole on the starting point and the measuring plate is aligned with the north direction on the north direction of the road map, the angle of an intermediate destination can be determined from the starting point with reference to the north direction, in that the thread is placed radially relative to the intermediate destination from the central borehole. The directional angle can be read directly at the point at which the thread crosses the degree scale and, for example, can be input manually in a navigation device by means of a keyboard. The direct distance between the starting point and the intermediate destination can be measured by means of the corresponding longitudinal scale at the measuring plate, while taking into account the scale of the road map, and can likewise be input in the navigation device. However, this solution has the disadvantage that the angle and the distance must be determined independently of one another by means of two different working steps for the input of each intermediate destination. In addition, the longitudinal scale must be searched again in each instance with the correct scale when measuring distances. In road maps whose scales are not available on the measuring plate the distances must be determined by corresponding conversion. Moreover, the measuring thread can easily be damaged or torn. With greater distances a bar measuring tool, or the like, is needed in addition.

SUMMARY OF THE INVENTION

With the present solution it is attempted to determine the distance and the directional angle of an intermediate destination on a road map with only one measuring step in order to input it manually into a navigation device.

In keeping with these objects and with others which will become apparent hereinafter, one feature of the invention resides, briefly stated, in a device of this type comprising the bracket having a guide at its other end area for the measuring tape which can be drawn out of said measuring tape case, wherein the guide is arranged in such a way that the measuring tape, when pulled out, extends away radially in an outward direction with its one lateral edge over a center of the scale on the angle measuring plate.

The device according to the invention, which comprises the characteristic features of the main claim, has the advantage that the measuring tape, which is rotatable with the bracket around the center of the angle measuring plate, can be pulled out of the measuring tape case until the selected intermediate destination in one measuring step, and the distance of the intermediate destination from the starting point, which coincides with the center of the angle measuring plate, can then be read off on the scale, and its angular deviation from the north direction can be read off on the degree scale simultaneously. The input of the intermediate destinations is accordingly substantially simplified, accelerated and facilitated. Another advantage is that the measuring tape is guided back again into the measuring tape case after completing the measurements and is accordingly protected against damage.

Advantageous developments and improvements of the characteristic features indicated in the main claim are made possible by means of the steps mentioned in the subclaims. It is particularly advantageous if the measuring tape case is fastened on the bracket so that it can be tilted horizontally relative to the angle measuring plate out of a vertical working position in order to minimize as much as possible the space required for placing this measuring device in the vehicle. The handling of the measuring device according to the invention can be further improved in that the measuring tape case can be locked in its folded up working position on the bracket. The measuring tape case is fastened in a housing in an advantageous manner, the housing is supported on a lower longitudinal side on the bracket by a hinge and is lockable in the working position behind a projection of the bracket by means of a catch. A further improvement in the handling of the measuring device is achieved in that the projection of the bracket clamps the measuring tape at the housing in the working position of the measuring tape case, which is provided with a restoring spring. In addition, it is advantageous if a support for the measuring tape is formed on next to the catch at the housing of the diaphragm case, which support effects the clamping of the measuring tape in the working position with the projection of the bracket and cancels the clamping when folded down. The accuracy of the angle measurement and reading is improved in that the guide of the measuring tape consists of two ribs which are formed on laterally at the bracket and through which the measuring tape runs, and additionally in that the bracket has an edge in the area of the degree scale, which edge is aligned with the measuring tape at its side which guides along the center of the angle measuring plate. Handling and measuring accuracy can be further improved in that the free end of the measuring tape carries a handle clip which forms a stop at the housing of the measuring tape case when the measuring tape is rolled in, and in that the handle clip has an edge on one side which is aligned with the measuring tape and the bracket, which edge has a notch at the free end of the measuring tape.

DRAWING

An embodiment example of the invention is shown in the drawing and is explained in more detail in the following description. FIG. 1 shows a spatial enlarged view of the measuring device, according to the invention, with a folded down measuring tape case, FIG. 2 shows the same measuring device in the working position with folded up measuring tape case in an enlarged spatial view, and FIG. 3 shows the measuring device for measuring an intermediate destination on a road map.

DESCRIPTION OF THE EMBODIMENT EXAMPLE

Figure 1:
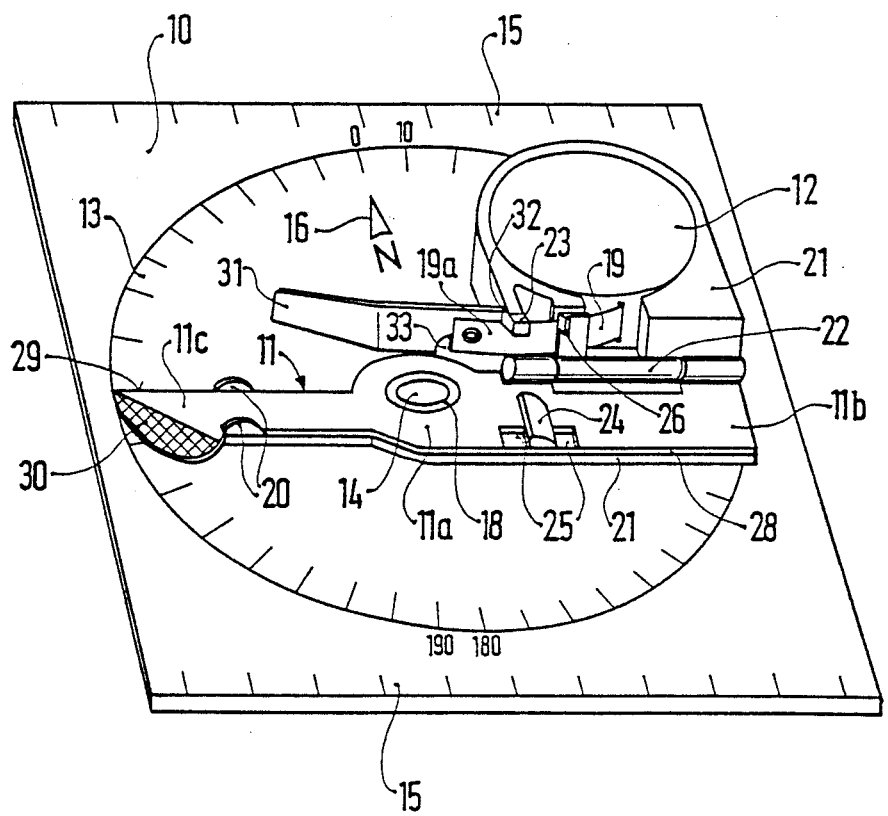

The device shown in the drawing for measuring the distance and direction of destinations on road maps from a predetermined starting point consists of an angle measuring plate 10, on which a bracket 11 is fastened so as to be rotatable, the bracket 11 in turn carries a measuring tape case 12, the angle measuring plate 10 is produced from transparent plastic and is provided on the underside with a 360-degree scale 13, a central borehole 14 being arranged in the center of the latter. A scale 15, by means of which the north direction can be adjusted on the angle measuring plate in each instance with the help of the longitudinal degrees of a road map, is plotted on the upper and lower edges of the angle measuring plate 10. An arrow 16 in the degree scale indicates the north direction, from which the degree scale 13 proceeds in the clockwise direction. Another means of assistance for aligning the north direction of the angle measuring plate 10 on the road map is formed by vertical and horizontal lines 17 within the degree scale 13 which are shown in FIG. 3. The bracket 11 is fastened by a tubular rivet 18 at its central area 11a so as to be rotatable at the central borehole 14 of the angle measuring plate 10. A bearing for the bracket 11 is provided on the angle measuring plate 10 by means of a thin plastic disk, which is not visible and is located between the angle measuring plate 10 and the bracket 11, the bearing prevents the bracket 11 from rubbing on the angle measuring plate 10 when the bracket 11 rotates. The bracket carries the measuring tape case 12 on its rear end area 11b located next to the bearing. The bracket 11 has a guide at its front end area 11c for the measuring tape 19 which is pulled out of the measuring tape case 12. The guide of the measuring tape case 19 consists of two semicircular guide ribs 20 which are formed on laterally at the bracket 11, the measuring tape 19 being guided through between them. It can be seen from FIG. 3 that the upper lateral edge of the pulled out measuring tape 19 extends away radially in an outward direction through this guide over the center of the angle measuring plate in the central borehole 14.

As shown in FIG. 1, the measuring tape case 12 is fastened on the bracket 11 so that it can be folded down out of its vertical working position toward the angle measuring plate 10. For this purpose, the measuring tape case, which is provided with a restoring spring for the measuring tape 19, is inserted in a housing 21 of plastic which is supported on the rear, lower longitudinal side by a hinge 22 on the bracket 11. The housing 21, with the measuring tape case 12 on the bracket 11, can be folded up into a vertical working position by means of this hinge 22, as shown in FIG. 2. The housing 21 of the measuring tape case 12 is provided on the underside with a catch 23 which locks in the working position behind a projection 24 of the bracket, as can be seen in an exposed view of the bracket 11 in FIG. 2. Recesses 25 are provided in the bracket 11 in front of and behind the projection 24, the catch 23 and a guide part 26 at the housing 21 of the measuring tape case 12 engage in these recesses 25 in the working position.

In order to facilitate the handling of the measuring tape 19 when measuring an intermediate destination, a support 27 is formed on next to the catch 23 at the housing 21 of the measuring tape case 12, which support 27 effects a clamping of the measuring tape 19 with the projection 24 of the bracket 11 in the working position of the measuring tape case 12 (FIG. 2), but cancels this clamping when folded down, so that the measuring tape 19 can then be drawn into the measuring tape case 12 again by the restoring spring. The bracket 11 has a rib 21 which is formed on along its front side and which serves partly to guide the measuring tape 19 and partly to position the housing 21 in the working position of the measuring tape case 12. In addition, the bracket 11 is provided with an edge 29 in its end area 11c remote of the measuring tape case 12 in the area of the degree scale 13, which edge 29 extends radially relative to the center of the angle measuring plate 10 and consequently is aligned with the drawn out measuring tape 19 at its upper side which leads over the center of the angle measuring plate 10. It is accordingly ensured that the exact directional angle can be read on the degree scale 13 with this edge 29 when measuring an intermediate destination. In order to prevent the directional angle from being read on the wrong side of the bracket 11, the end area 11c of the bracket 11 can be constructed as a point, or the rest of the area can be rounded and possibly provided with a hatching 30.

At its free end 19a, the measuring tape 19 carries a riveted on handle clip 31 which, as can be seen in FIG. 1, forms a stop at the housing 21 of the measuring tape case 12 when the measuring tape 19 is rolled in, in that it rests against the housing 21 behind the catch 23 with its shoulder 32 which projects forward laterally at the measuring tape 19. In order to place the free end 19a of the measuring tape 19 as accurately as possible on an intermediate destination the handle clip 31 is provided with a notch 33 on the longitudinal side of the measuring tape 19 at the free end 19a of the measuring tape 19, which longitudinal side leads over the center of the angle measuring plate 10. In order to avoid measuring with the wrong side of the measuring tape 19 the handle clip 31 likewise has a hatching 34 on the area remote of the notch 33 (FIG. 2).

FIG. 3 shows the section of a road map 35 from which an intermediate destination B is to be measured from a starting point A with the measuring device according to the invention in order to input its distance and directional angle into a navigation device of a motor vehicle. For this purpose, the angle measuring plate 10 of the measuring device is first placed with the central borehole 14 on the starting point A of the road map 35. Next, by means of the longitudinal degrees 36 plotted on the road map 35, the angle measuring plate 10 and directional arrow 16 are exactly aligned with the north direction of the road map 36 by means of the lines 17 and the scale 15. In case the measuring tape case 12 was not yet put into its working position beforehand, it is now folded up and locked with the bracket 11. By means of the handle clip 31 the measuring tape 19 is now pulled out of the measuring tape case 12 until the free end 19a of the measuring tape 19 comes to rest in the notch 33 of the handle clip 31 on the selected intermediate destination B. The direct distance to the intermediate destination is now read off in millimeters on the measuring tape 19 at the starting point A in the central borehole 14 of the angle measuring plate 10. In order to input this distance in the navigation device the scale of the road map 35 is determined beforehand and input by means of a data input of the navigation device. The intermediate destination distance is then fed into the navigation device via the input and, finally, the directional angle of the intermediate destination B relative to the north direction at the edge 29 of the bracket 11 is read on the degree scale 13, 270 degrees in the example, in order to likewise feed it into the navigation device via the data input. Of course, this may be done in the reverse sequence by first inputting the directional angle and then the distance of the intermediate destination B from the starting point A in the navigation device.

By means of a compound navigation, the position of the vehicle with reference to the input intermediate destination can then be determined and indicated by means of the input data. If a plurality of intermediate destinations are to be traveled one after the other, the individual intermediate destinations of the road map 35, or of a plurality of road maps, are measured one after the other and input in the navigation device by means of the data input. It is substantial that for each intermediate destination the distance, as well as the directional angle, can be determined with the measuring device according to the invention in only one measuring step. When all intermediate destinations are measured the housing 21, with the measuring tape case 12, is folded down again into the rest position on the angle measuring plate 10, wherein the clamping of the measuring tape 19 by means of the projection 24 of the bracket 11 is canceled and the measuring tape 19 is automatically drawn back by the restoring spring into the initial position shown in FIG. 1. By means of using the collapsible measuring tape case 12, the measuring device, which is seen in the original size in FIG. 1, has a compact construction with small dimensioning on the one hand and, on the other hand, because of the guiding of the relatively long measuring tape, has a large and accurate measuring range which is also sufficient for large city maps and road maps.

Deviations from the embodiment example can be carried out within the framework of the present invention. Thus, it is possible, for example, to provide a film hinge or an imitation piano hinge, instead of the door hinge 22, for fastening the diaphragm case on the bracket so that it may be folded down. It is also possible within the framework of the invention to provide the measuring tape 19 without clamping in the working position or to provide it with a conventional locking means within the diaphragm case 12 which can be canceled by means of actuating a push button in a known manner.

It will be understood that each of the elements described above, or two or more together, may also find a useful application in other types of constructions differing from the types described above.

While the invention has been illustrated and described as embodied in a device for measuring the distance and direction of destination on road maps, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a device for measuring the distance and direction of destinations on road maps from a starting point for the input of intermediate destinations in navigation devices, comprising a transparent angle measuring plate (10) which has a central borehole (14) and a 360-degree scale (13) arranged concentrically relative to the central borehole and having a mark for the north direction for the beginning of said degree scale; a bracket (11) having one end area, another end area and a middle area and being supported at said central borehole (14) of said angle measuring plate (10) by said middle area (11a) so as to be rotatable and so as to extend in a plane-parallel manner relative to the angle measuring plate, said bracket carrying a measuring tape case (12) positioned at said one end area (11b); means for fastening said measuring tape case (12) on said bracket in such a way that said measuring tape case can be folded down out of a vertical working position toward said angle measuring plate (10), the improvement comprising said bracket (11) having a guide (20) at said another end area (11c) for the measuring tape (19) which can be drawn out of said measuring tape case (12), said guide (20) being arranged in such a way that said measuring tape (19), when drawn out, extends away radially in an outward direction with its one lateral edge over a center of said scale (13) on said angle measuring plate (10); means to lock said measuring tape case in the vertical working position on said bracket, said lock means including a projection (24) provided on said bracket, said fastening means including a housing accommodating said measuring tape case and supported on said bracket and being lockable by said lock means in said working position at said projection of said bracket.

2. Device according to claim 1, wherein said projection (24) of said bracket (11) clamps said measuring tape (19) at said housing (21) in said working position of said measuring tape case (12), which is provided with a restoring spring.

3. Device according to claim 2, wherein said measuring tape (19) has a free end which carries a handle clip (31) forming a stop at said housing (21) of said measuring tape case (12) when said measuring tape (19) is rolled in and having a longitudinal side which is aligned with said measuring tape (19) and said edge (29) of said bracket (11) and comprises a notch (33) at said free end (19a) of said measuring tape (19).

4. Device according to claim 1, wherein said guide of said measuring tape (19) at said end area (11c) of said bracket (11) remote of said measuring tape case (12) includes two guide ribs (20) which are formed laterally at said bracket (11), said measuring tape (19) being guided between said two guide ribs (20).

5. Device according to claim 1, wherein said measuring tape has a longitudinal side leading over the center of said scale (13), and said bracket (11) comprises an edge (29) in said end area (11c) which covers said scale (13) of said angle measuring plate (10), which edge (29) is aligned with said longitudinal side of said measuring tape (19) leading over the center of said scale (13).

6. Device according to claim 1, said fastening means including a hinge (22) by means of which said housing (21) is supported on said bracket.

7. Device according to claim 1, said lock means including a catch (23) by means of which said housing is lockable in said working position at said projection (24) of said bracket (11).

8. Device according to claim 7, wherein said housing has a support (27) for said measuring tape (19), said support (27) being formed on said housing (21) of said measuring tape case (12) near said catch (23), said support (27) effecting a clamping of said measuring tape (19) with said projection (24) of said bracket (11) in said working position of said measuring tape case (12) and cancelling said clamping when said measuring tape case is folded down.

* * * * *